US010865345B2

(12) United States Patent
Riedewald

(10) Patent No.: US 10,865,345 B2
(45) Date of Patent: Dec. 15, 2020

(54) PROCESS AND SYSTEM FOR WHOLE TYRES AND PLASTIC COMPOSITES PYROLYSIS TO FUEL CONVERSION AND COMPOUND RECOVERY

(71) Applicant: Frank Riedewald, Cork (IE)

(72) Inventor: Frank Riedewald, Cork (IE)

( * ) Notice: Subject to any disclaimer, the term of this patent is extended or adjusted under 35 U.S.C. 154(b) by 536 days.

(21) Appl. No.: 14/423,531

(22) PCT Filed: Jul. 12, 2013

(86) PCT No.: PCT/EP2013/064866
§ 371 (c)(1),
(2) Date: Feb. 24, 2015

(87) PCT Pub. No.: WO2014/032843
PCT Pub. Date: Mar. 6, 2014

(65) Prior Publication Data
US 2015/0184079 A1  Jul. 2, 2015

(30) Foreign Application Priority Data
Aug. 30, 2012 (IE) ...................................... 2012/0379

(51) Int. Cl.
*B01J 19/16* (2006.01)
*C10B 53/07* (2006.01)
(Continued)

(52) U.S. Cl.
CPC .............. *C10B 53/07* (2013.01); *C10B 11/00* (2013.01); *C10B 27/06* (2013.01); *C10B 31/06* (2013.01);
(Continued)

(58) Field of Classification Search
CPC .... C10G 1/10; C10G 9/00; B01J 6/008; B01J 19/16; B01J 2219/00905
(Continued)

(56) References Cited

U.S. PATENT DOCUMENTS 3,770,419 A    11/1973 Brown
4,082,615 A *   4/1978 Komuro ................. C10B 49/10
                                                    201/12
(Continued)

OTHER PUBLICATIONS

Chambers et al., Polymer Waste Reclamation by Pyrolysis in Molten Salts; Ind. Eng. Chem. Process Des. Dev. 23, pp. 648-654, 1984.

*Primary Examiner* — Natalia Levkovich
(74) *Attorney, Agent, or Firm* — Cesari & McKenna, LLP

(57) ABSTRACT

Disclosed is a process for treating waste plastic materials such as whole tyres, coarsely cut tyres, large plastic pieces, plastic composites such as hoses or combinations of above into gases, liquids and solids by direct heating in a pyrolysis liquid (1) such as molten salt or molten metal. The pyrolysis system is constructed such that the segregation of the light and heavy materials occurs within the pyrolysis chamber. The carbon black is segregated from the pyrolysis vapours via a cyclone and fractions of carbon black may be obtained by installing a number of cyclones in series so that different qualities of carbon black may be produced. Diesel or other oils, steel, carbon black, ZnO and synthesis gas are recovered; all of which can be feed streams to other processes. This process avoids the inefficient procedure of cutting the tyres or other plastic composites into small pieces before treatment by pyrolysis and also recovers valuable components.

10 Claims, 4 Drawing Sheets

(51) Int. Cl.
    *C10B 49/14*     (2006.01)
    *C10G 1/10*     (2006.01)
    *C10B 11/00*     (2006.01)
    *C10B 27/06*     (2006.01)
    *C10B 31/06*     (2006.01)
    *C10L 1/08*     (2006.01)

(52) U.S. Cl.
    CPC ............. C10B 49/14 (2013.01); C10G 1/10 (2013.01); C10L 1/08 (2013.01); *C10L 2200/0469* (2013.01); *C10L 2270/026* (2013.01); *C10L 2290/02* (2013.01); *C10L 2290/544* (2013.01); *Y02P 20/143* (2015.11)

(58) Field of Classification Search
    USPC ........... 422/613, 614, 624, 150; 202/96, 105
    See application file for complete search history.

(56) References Cited

U.S. PATENT DOCUMENTS

| | | | | |
|---|---|---|---|---|
| 5,085,738 A | * | 2/1992 | Harris | C10B 7/06 |
| | | | | 201/11 |
| 5,735,933 A | * | 4/1998 | Yokoyama | C22B 5/16 |
| | | | | 429/49 |
| 5,836,524 A | | 11/1998 | Wang | |
| 2010/0076245 A1 | | 3/2010 | Kaczmarek | |

* cited by examiner

PROCESS AND SYSTEM FOR WHOLE TYRES AND PLASTIC COMPOSITES PYROLYSIS TO FUEL CONVERSION AND COMPOUND RECOVERY

CROSS REFERENCE TO RELATED APPLICATIONS

This application is the National Stage of International Application No. PCT/EP2013/064866, filed on Jul. 12, 2013, which claims the benefit of Ireland Application No. 2012/0379, filed on Aug. 30, 2012. The contents of both applications are hereby incorporated by reference in their entirety.

TECHNICAL FIELD

The invention relates to the compound recovery i.e. fuel, steel, ZnO, glass from plastic and rubber waste materials.

DESCRIPTION OF THE PRIOR ART

The pyrolysis of tyres and plastics is a thermochemical decomposition process at elevated temperatures under the exclusion of oxygen.

The chemistry of tyre pyrolysis is well investigated and established as is evident by a number of publications such as: Isabel de Marco Rodriguez et al., Pyrolysis of scrap tyres, Fuel Processing Technology 72 (2001) 9-22; M. F. Laresgoiti et al., Characterization of the liquid products obtained in tyre pyrolysis, J. Anal. Appl. Pyrolysis 71 (2004) 917-934; M. Felisa Laresgoiti et al., Chromatographic analysis of the gases obtained in tyre pyrolysis, J. Anal. Appl. Pyrolysis 71 (2004) 917-934 or J. D. Martinez, N. Puy, R. Murillo, T. Garcia, M. V. Navarro and A. M. Mastral, Waste tyre pyrolysis—A review, Renewable and Sustainable Energy Reviews, 23 0 (2013) 179-213.

The chemistry of plastic pyrolysis is equally well established; see for instance "Feedstock Recycling and Pyrolysis is of Waste Plastics: Converting Waste Plastics into Diesel and Other Fuels" edited by J. Scheirs and W. Kaminsky, 2006, John Wiley & Sons, Ltd.

Most modern tyres are of belted radial construction, wherein the fabric cords are oriented radially and a circumferential steel, fibreglass, or fabric belt overlays the cords and underlays the rubber. The most commonly used tyre rubber is styrene-butadiene copolymer (SBR), which contains about 25% by weight of styrene. A typical recipe or composition for a 10 kg passenger new car tyre is as per the table below:

| Component | Wt % |
| --- | --- |
| Styrene-butadiene copolymer (SBR) | 40-60 |
| Carbon black | 27-30 |
| Steel | 14-16 |
| Fabric, fillers, accelerators | 16-17 |
| Zinc oxide (ZnO) | 1.9 |
| Sulphur | 1.1 |

Lacking, however, is a cost effective process, which makes recovery of most of the valuable chemical compounds such as hydrocarbon liquids, carbon black, steel, zinc oxide (ZnO) and non-condensable gaseous products such as butane and methane straightforward.

Most processes dealing with scrapped tyres first shred the tyres into pieces easier to deal with. This approach is, for instance, taken by US. Pat. 2012/0103780 A1, US. Pat. 2002/0119089 A1, U.S. Pat. No. 5,720,232, and by the Japanese patent JP 2003211140(A). Unfortunately, the very characteristics that make tyres long lasting and resistant to decomposition at moderate temperatures make tyres difficult to disintegrate. While shredding overcomes some process difficulties for handling a bulky material of varying size, it greatly increases the capital, energy and maintenance requirements of these processes. Hence it would be desirable from an economic point of view if whole tyres could be fed to a tyre pyrolysis process.

U.S. Pat. No. 4,384,151 discloses a process for converting scrapped tyres to fuel. Whole or coarsely cut tyres are treated by means of heavy oil flowing thereon, without immersion in a bath of oil. Carbon black or other compounds such as ZnO are not recovered by this process.

US. Pat. Publication 2011/0171114 A1 discloses a pyrolysis process in which whole tyres are immersed in a molten zinc alloy. This process requires doors to be directly exposed to the high operating temperatures of the molten zinc. The hydrocarbon vapours emitted from the process are condensed and recovered as a liquid. Due to the high density of the molten zinc, the pyrolysis solid products such as carbon black and ZnO are recovered from the top of the molten zinc by a screw auger, which is also exposed to the high operating temperatures of the molten zinc. However, exposing mechanical and other devices to molten zinc is potentially problematic as it can result in frequent equipment failures. Hence it would be desirable from an economic point of view if multiple compounds could be recovered from a tyre pyrolysis process without the need of mechanical devices such as augers or movements of tyres to and from the reaction chamber as mechanical devices especially doors, which are in direct contact with the molten zinc, may not seal properly at all times, may jam or break down.

Generally it is undesirable to have water present within a tyre, as water is expensive to evaporate and it does not form any useful product. However, the geometry of a tyre allows water to accumulate within its body from where it is difficult to dislodge. For some processes, for instance US. Pat. 2011/0171114 A1, water is detrimental as treatment of a tyre filled with water could result in over-pressurisation of the reaction chamber. Therefore the tyre must be dried by vacuum drying in a chamber prior to immersion of the tyre in the molten zinc bath. This drying process reduces the overall throughput of the plant and is expensive as a vacuum pump may have to run for a considerable amount of time to draw off the water. A different approach to tyre drying is taken by U.S. Pat. No. 5,057,189. This patent proposes to use superheated steam, which is expensive to generate and requires high pressure equipment, to dry the tyres. Hence it would desirable from an economic point of view if the pyrolysis process could handle tyres in which at least some water may be present.

The Japanese patent JP 2003211140(A) discloses a pyrolysis process for shredded tyre pieces. The tyre pieces are loaded into a charging vessel and then charged into a pyrolysis chamber filled with a molten salt. The steel pieces and the carbon are separated from the molten salt by other unit operations. It is, however, possible to separate these two materials within the pyrolysis chamber, if instead of molten salt a different pyrolysis liquid is used resulting in increased economics of the process.

WO 2011/035812A1 discloses a multistage tyres pyrolysis process. Three heating zones (a) 100 to 200° C., (b) 200 to 350° C. and (c) 300 to 600° C. are used to decompose the shredded tyres in about 2-4 hours. Drawbacks of this system include that the tyres must be shredded and the steel removed prior to pyrolysis. In addition the pyrolysis reaction time is 2 to 4 hours; hence the requirements of multiple reactors to achieve commercial throughput requirement increasing capital and operational costs. Moreover the tyre pieces are moved through the reactor by means of a screw, which may be liable to mechanical breakdowns.

It is therefore an object of the present invention to provide a system and process for the pyrolysis of tyres or large plastic parts that overcomes at least one of the above mentioned problems.

SUMMARY OF THE INVENTION

According to the invention there is provided, as set out in the appended claims, a system for recycling feed materials such as whole or part tyres of various sizes, cut or un-cut or large plastic pieces or small plastic pieces or other plastic composites such as glass fibre reinforced plastics, metal coated plastics such as hoses and pure or mixed non-composite plastics or combinations thereof, the system comprising:

means for charging said feed material into a charging vessel (29), said charging vessel (29) adapted to remove air from said feed material;

means for charging said feed material from said charging vessel (29) into a pyrolysis chamber (3) comprising a pyrolysis liquid (1);

means for allowing heavy and light solid pyrolysis products associated with said feed material to separate within said pyrolysis liquid (1) such that the light solid pyrolysis products separate to the top of said pyrolysis liquid (1);

means for removing any pyrolysis vapours and said light solid pyrolysis products via extractor (6) from the surface of said pyrolysis liquid (1); and means for removing said heavy solid pyrolysis products from the bottom of said pyrolysis chamber (3) with a removal device (16, 19).

The present invention solves the problems hereinbefore described. As a result the invention provides a much improved method for the pyrolysis of whole tyres and large plastic parts by direct heating. Furthermore the present invention has no mechanical devices exposed to the molten metal, it allows water to be present and, at the same time, it allows the collection of the pyrolysis oil, black carbon, steel and other valuable materials simply and effectively. It will be appreciated that the feed material can be any type of plastic material suitable to recycling. In one embodiment said pyrolysis chamber (3) comprises a substantially U shaped structure.

In one embodiment said pyrolysis chamber (3) comprises at least two legs (A, B) so that at least one leg (B) can be open to the atmosphere without emitting said pyrolysis vapours to the atmosphere from said leg (B) when the surface of said pyrolysis liquid (1) in said leg (B) is exposed to the atmosphere.

In one embodiment said pyrolysis chamber (3) comprises of a sloped bottom, the pyrolysis chamber lower wall (2), so that said heavy solid pyrolysis products collect at a low point of said pyrolysis chamber (3).

In one embodiment said pyrolysis chamber lower wall (2) of said pyrolysis chamber (3) is at an angle of between 10 and 60 degrees.

In one embodiment said pyrolysis chamber (3) comprises of a plurality of said low points.

In one embodiment said pyrolysis chamber (3) is equipped with a plurality of drains located at or near said low points.

In one embodiment said removal device (16, 19) comprises a plurality of devices which are either movable or stationary.

In one embodiment said removal device (16, 19) removes said heavy solid pyrolysis products from one or a plurality of low points of said pyrolysis chamber (3).

In one embodiment said extractor (6) comprises a lance or other extractor means.

In one embodiment there is provided means for separating said pyrolysis vapours and said light solid pyrolysis products in cyclone (9).

In one embodiment said cyclone (9) comprises of a plurality of cyclones installed in parallel or in series or combinations thereof adapted to allow the collection of different fractions of said low density solid pyrolysis products.

In one embodiment said charging vessel (29) is equipped with a conveyor (30) or a ram system designed to charge said feed material into said pyrolysis chamber (3).

In one embodiment said charging vessel (29) comprises a plurality of vessels.

In one embodiment said charging vessel (29) is a vertical vessel or a plurality of vertical or horizontal vessels or combinations thereof.

In one embodiment an auger is used to remove said light pyrolysis products from said pyrolysis chamber (3).

In one embodiment said auger is comprised of a plurality of augers removing said light pyrolysis products from the said pyrolysis chamber (3) from a plurality of locations.

In one embodiment there is provided a single or a plurality of extractors (9) and said single or a plurality of augers or combinations thereof adapted to increase performance.

In one embodiment said light solid pyrolysis products and said pyrolysis vapours are removed from said pyrolysis chamber (3) via a single or a plurality of slots located in the sidewall of said pyrolysis chamber (3).

In one embodiment said pyrolysis liquid (1) is a molten non-ferrous metal and selected from at least one of zinc, tin, lead, aluminium, copper or alloys thereof.

In one embodiment said pyrolysis liquid (1) comprises a molten salt such as LiCl, KCl, KOH, NaOH, cyanides, nitrates, nitrites or combinations thereof.

In one embodiment on top of said leg B is a molten salt of lower density than said molten non-ferrous metal to allow the removal of the non-ferrous coating from the surface of said heavy solid pyrolysis products on its removal from said leg B.

In one embodiment said molten salt on top of leg B is of sufficient depth to remove the non-ferrous metal from said heavy solid pyrolysis products (i.e. steel) when said heavy solid pyrolysis products are removed from said pyrolysis chamber (3).

In one embodiment said cyclone (9) is comprised of filters, cyclones, zig-zag sifters or eddy flow separators installed in series or in parallel or combinations thereof.

In one embodiment cyclone (9) and the carbon black collecting silo are maintained at a temperature of at least 100° C.

In one embodiment one or a plurality of plungers (23) are used to submerge the steel wires or other heavy materials floating on the surface of said pyrolysis liquid (1).

In a further embodiment of the invention there is provided a method of recycling plastic feed materials such as whole or part tyres of various sizes, cut or un-cut or large plastic pieces or small plastic pieces or other plastic composites such as glass fibre reinforced plastics, metal coated plastics such as hoses and pure or mixed non-composite plastics or combinations thereof, the method comprising the steps of:

- charging said feed material into a charging vessel (29), said charging vessel (29) adapted to remove air from said feed material;
- charging said feed material from said charging vessel (29) into a pyrolysis chamber (3) comprising a pyrolysis liquid (1);
- allowing heavy and light solid pyrolysis products associated with said feed material to separate within said pyrolysis liquid (1) such that the light solid pyrolysis products separate to the top of said pyrolysis liquid (1);
- removing the pyrolysis vapours and said light solid pyrolysis products via extractor (6) from the surface of said pyrolysis liquid (1); and
- removing said heavy solid pyrolysis products from the bottom of said pyrolysis chamber (3) with a removal device (16, 19).

In one embodiment the method comprises the step of separating said pyrolysis vapours and said light solid pyrolysis products in said cyclone (9).

In another embodiment there is provided a system for recycling feed materials, the system comprising:

- a conveyor for charging said feed material into a charging vessel (29), said charging vessel (29) adapted to remove air from said feed material;
- conveying said feed material from said charging vessel (29) into a pyrolysis chamber (3) comprising a pyrolysis liquid (1) and allowing heavy and light solid pyrolysis products associated with said feed material to separate within said pyrolysis liquid (1) such that the light solid pyrolysis products separate to the top of said pyrolysis liquid (1);
- an extractor for removing any pyrolysis vapours and said light solid pyrolysis products via extractor (6) from the surface of said pyrolysis liquid (1); and
- a device for removing said heavy solid pyrolysis products from the bottom of said pyrolysis chamber (3).

In one embodiment the feed material comprises at least one of whole or part tyres of various sizes, cut or un-cut or large plastic pieces or small plastic pieces or other plastic composites such as glass fibre reinforced plastics, metal coated plastics such as hoses and pure or mixed non-composite plastics or combinations thereof.

There is also provided a computer program comprising program instructions for causing a computer program to carry out and control the above method which may be embodied on a record medium, carrier signal or read-only memory.

BRIEF DESCRIPTION OF THE DRAWINGS

The characteristics and advantageous characteristics of the present invention are detailed in this section based on the accompanying drawings, given as a non-restrictive example, with reference to the attached drawings wherein.

DRAWINGS LEGEND

Figure 1:
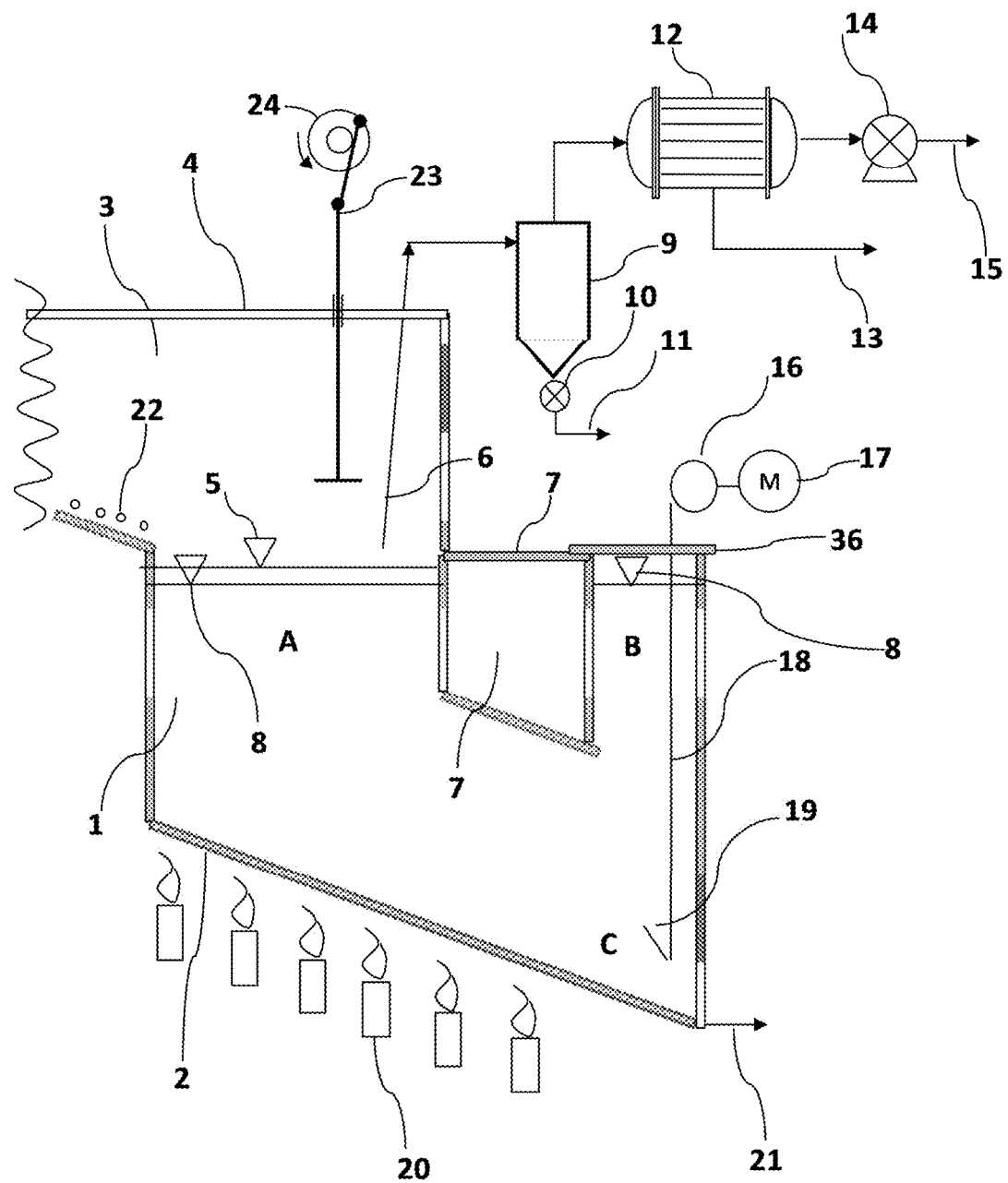
FIG. 1 is a cross sectional drawing of the pyrolysis chamber according to one embodiment of the invention.

1. Pyrolysis liquid
2. Pyrolysis chamber lower wall
3. Pyrolysis chamber
4. Pyrolysis chamber upper wall
5. Solids level (dross) on pyrolysis liquid
6. Extractor
7. Leg A and Leg B separator
8. Pyrolysis liquid level in leg B (or A)
9. Cyclone
10. Cyclone rotary valve
11. Solids removal line
12. Condenser system
13. Liquid removal line
14. Fan
15. Non-condensable line
16. Removal device
17. Motor
18. Chain or similar for removal device
19. Removal device
20. Burner
21. Drain
22. Gravity conveyor
23. Plunger
24. Motor/gearbox for plunger
25. Charging vessel exit door
26. Vacuum pump exhaust to atmosphere
27. Vacuum pump
28. Line from charging vessel to vacuum pump
29. Charging vessel
30. Conveyor inside tyre charging vessel
31. Nitrogen supply line
32. Charging vessel entry door
33. Belt conveyor
34. Belt conveyor
35. Tyre or more general "feed material"
36. Removable plates for crane access
37. Inlet from plastic extruder

DETAILED DESCRIPTION

In the figures, the same constitutional elements or components are represented by the same reference numerals as given in the drawings legend. In the following the present invention is described by the example of tyre pyrolysis. Other plastic components are treated in a similar manner.

Figure 2:
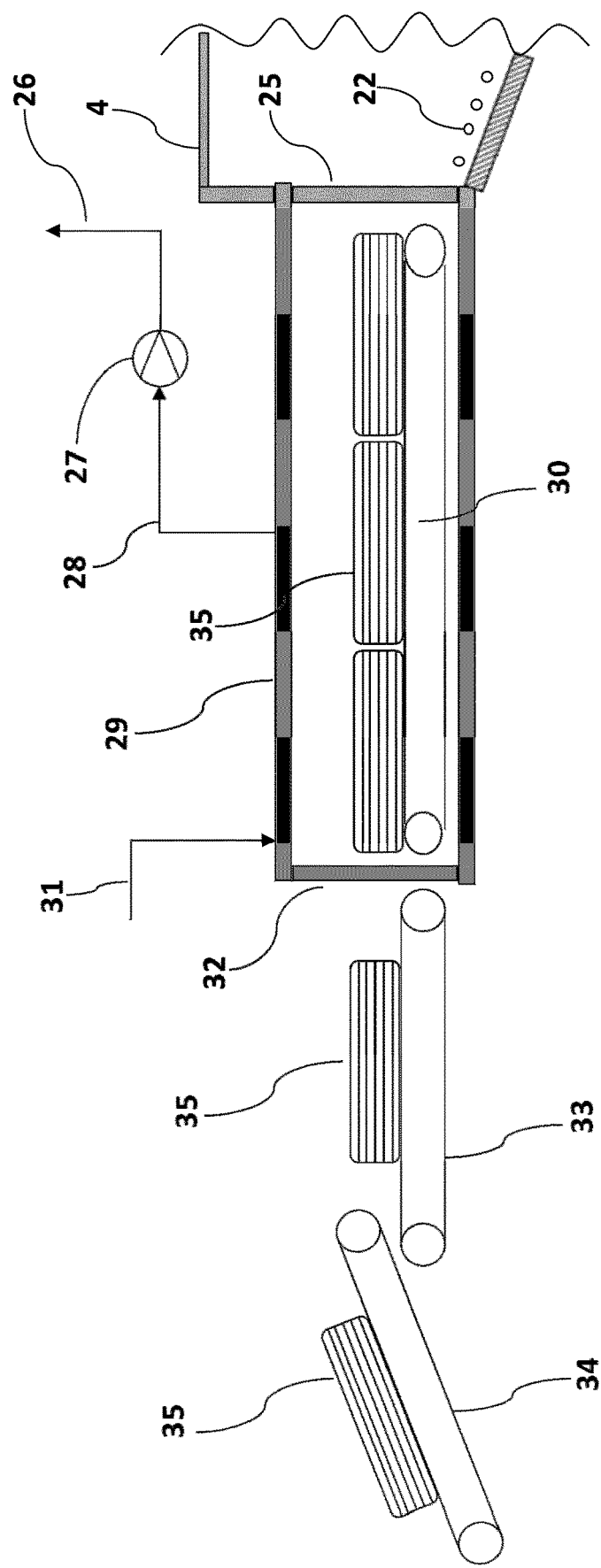
FIG. 2 is a drawing of the tyre charging vessel and its associated equipment.
Figure 3:
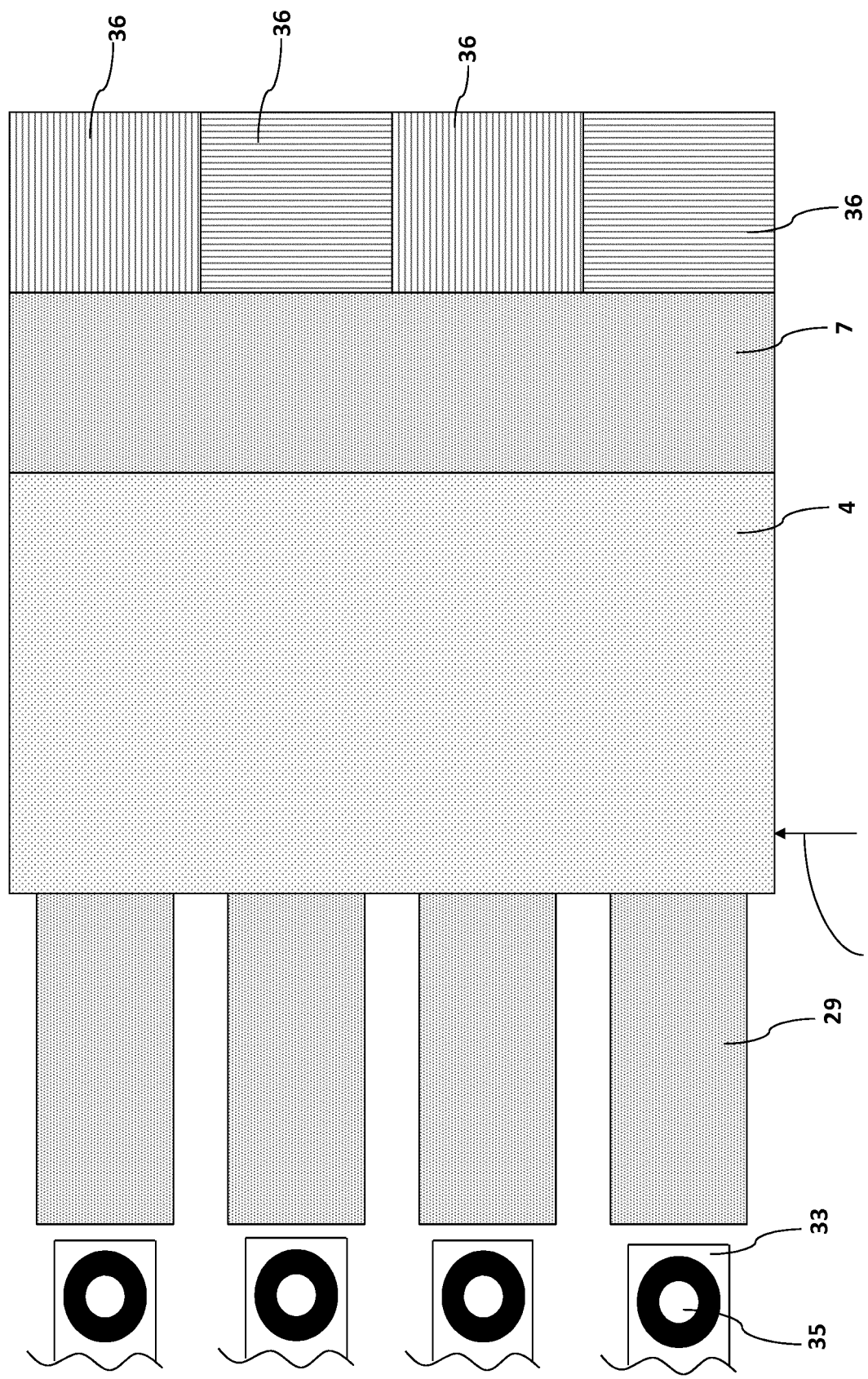
FIG. 3 is a drawing of the top view of the pyrolysis chamber, associated equipment and a number of tyre charging vessels.

Referring now to FIGS. 1, 2 and 3, illustrates a preferred embodiment of the invention, showing waste tyres to be pyrolised fed into charging vessel 29 by belt conveyors 33 and 34 or by other means.

Once the charging vessel 29 is fully charged with tyres, the charging vessel entry door 32 is closed; the air in the vessel is removed by vacuum pump 27 and subsequently broken with nitrogen until the vessel is inerted. It will be appreciated that there are numerous ways of removing air from the charging vessel, for example by displacement, dilution, pressure swing purging or combinations thereof utilising an inert gas such as nitrogen and are well known in the art. Nitrogen is commonly used although other gases such as argon can also be used.

Once the above step is completed, the charging vessel exit door 25 is opened and the tyres in charging vessel 29 are charged via conveyor 30 and gravity conveyor 22 one by one into a pyrolysis liquid 1 (in one embodiment molten zinc can be used as the pyrolysis liquid; however other materials are also possible). Due to the high operating temperature of the pyrolysis liquid 1 (typically >400° C.), the tyres readily decompose into vapour, char or carbon, steel and other components.

The top dross on pyrolysis liquid 1 is, together with the pyrolysis vapours, removed from the pyrolysis chamber 3 by extractor 6. However, some of the solids may remain on top of the pyrolysis liquid 1. These remaining solids are removed once in a while by drossing the top of the pyrolysis liquid 1 after the pyrolysis chamber 3 has been opened. The solids are segregated from the vapour stream by cyclone 9. The solids exit the system via cyclone rotary valve 10 and solids removal line 11 for further processing or as a product. The vapours are condensed by a condenser system 12 (multiple condensers with a recycle line to return long-chained hydrocarbons back to the pyrolysis chamber 3 for re-cracking and a fractionation column may be used—not shown) to a liquid (line 13), which may be processed further, for instance, to diesel. The suction or driving force for the vapour/top dross removal is provided by fan 14. The non-condensable gases i.e. methane, propane (line 15) may be send to burners 20 and minimise the energy requirements of the pyrolysis process or may be used to generate electricity or both.

The steel wires from the tyres sink to the pyrolysis chamber lower wall 2 and, due to the slope of this wall, accumulate in area C (see FIG. 1) where they can be removed by removal device 16 with the help of removal device 19. Plunger 23 may be used to push the steel wires below the surface of the pyrolysis liquid 1.

The removal device 16 may operate on a batch basis. During times when 16 is idle, the removal device 19 may be removed from the pyrolysis liquid 1. Leg B may be closed with covers 36 to minimise heat losses and for safety reasons.

As the pressure inside the pyrolysis chamber is only slightly above atmospheric (generally not more than 100 mbar), the liquid level in leg B is nearly equal to the liquid level in leg A (see FIG. 1). This is due to the fluid statics principle of leg A and B being filled with a continuous fluid. However if another liquid is located on top of leg B, the liquid levels of legs A and B may be different.

The operating temperature of cyclone 9 may be maintained at a high temperature, preferably at the same temperature as the pyrolysis liquid 1 to minimise hydrocarbon vapour adsorption of the carbon black. Moreover the silo collecting the carbon black from cyclone 9 may also be maintained at a temperature exceeding 100° C., so that hydrocarbons adsorbed may be driven off.

Similar to tyres, large pieces of plastic material may also be charged to the pyrolysis chamber via charging vessel 29.

Various process parameters of the system may be monitored. For example the liquid levels in legs A, B; the pressure in the pyrolysis chamber 3 and the condenser temperature.

Smaller plastic material not suitable for charging to the pyrolysis chamber via the charging vessel 29 can be charged to the pyrolysis chamber 3, for instance, with an extruder (not shown) via line 37 (FIG. 3).

A molten salt, which may be located on Leg B, may be the eutectic (58.2 mol % LCl and 41.8 mol % KCl) or near eutectic mixture of LiCl—KCl (: A. S. Basin, A. B. Kaplun, A. B. Meshalkin and N. F. Uvarov, The LiCl—KCl Binary System, Russian Journal of Inorganic Chemistry, 2008, Vol. 53, No. 9, pp. 1509-1511). This molten salt layer may provide a de-galvanising step when the steel wires are moved through the molten salt, minimising loss of zinc from the process on steel wire removal.

Figure 4:
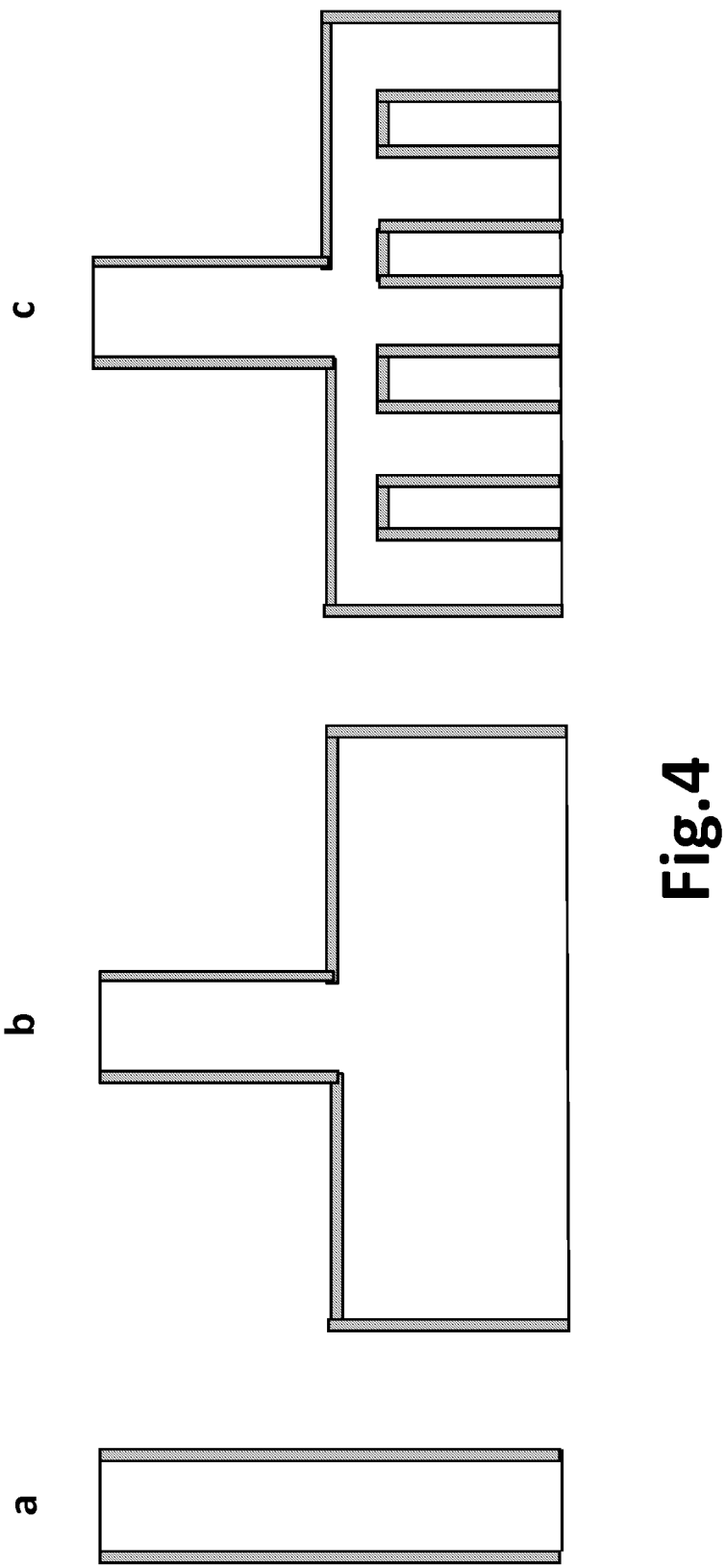
FIG. 4 is a drawing of a number of different extractors.

FIG. 4 illustrates a number of different embodiments that can be used as an extractor, where 'a' show a simple lance type extractor, 'b' a lance extractor with broader opening at one end, and 'c' a manifold type extractor adapted for removing the pyrolysis vapours and light solid pyrolysis products from the surface of the pyrolysis liquid 1.

A desirable characteristic of the present invention is that the solids separate by gravity into steel, ZnO and carbon compounds. Assuming a liquid with a suitable density as the pyrolysis liquid 1, the carbon and ZnO separate to the surface of the pyrolysis liquid 1, whereas the steel wires sink and collect at C (see FIG. 1) as this is the lowest point of the pyrolysis chamber 3.

Another desirable characteristic of the present invention is that non-condensable gases such as methane or propane can be routed to the burners minimising the additional energy requirements of the pyrolysis process.

Another desirable characteristic of the present invention is that water, which may be present in the tyres, can remain, as the pyrolysis chamber can be designed to handle the maximum possible amount of water present in a tyre. However tyres filled with excessive amounts of water may be cut, for example, in half to remove this water. These cut tyres are treated by the invention in the same fashion as uncut tyres. The removal of water improves the economics of the system as it is expensive i.e. energy intensive to evaporate water. However, further size reduction of the tyres is not necessary and cutting the tyres in half are only required on tyres containing excess amounts of water.

Another desirable characteristic of the present invention is that the steel is recovered as scrap for the steel industry increasing the economics of the process. Since the tyres are not cut (or just cut in half) before processing them, the steel wires maintain their integrity and can be recovered in full from the process making the recovery of the steel wires from the pyrolysis chamber 3 straightforward.

Another desirable characteristic of the present invention is that other waste plastics may be added to the pyrolysis chamber for treatment by, for instance, an extruder or other means (not shown on drawings).

Another desirable characteristic of the present invention is that the vapours can be condensed to oil i.e. diesel fuel.

Another desirable characteristic of the present invention is that vapour emissions do not occur from leg B (see FIG. 1). Hence this part of the pyrolysis chamber may be opened to the atmosphere without causing vapour emissions which otherwise may have to be abated.

Another desirable characteristic of the present invention is that the pyrolysis process is fast as the heat transfer is by direct rather than by indirect heating as would, for instance, be the case in a rotary kiln. As a result the throughput of this process is improved.

Another desirable characteristic of the present invention is that the pyrolysis process is readily scalable as only the number or size or both of charging vessels 29 and the size of the pyrolysis chamber 3 needs to be increased, avoiding the difficulties of scale up as encountered with rotary kilns or similar devices.

Another desirable characteristic of the present invention is that catalysts are not required, which would be expensive and may also result in an expensive waste disposal problem, increasing the economic value of the process.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A system for recycling a feed material, the system comprising:
    a pyrolysis chamber for containing a pyrolysis liquid during operation, the pyrolysis chamber having a top and a bottom opposed the top, said pyrolysis liquid being molten zinc, tin, aluminum, copper, or an alloy thereof;
    a charging vessel for removing air from said feed material and equipped with means for charging the feed material from the charging vessel into the pyrolysis chamber, the charging vessel having an entry door and an exit door, when the exit door is open, the charging vessel is in communication with the pyrolysis chamber at a charging end of the pyrolysis chamber;
    one or more burners for heating and maintaining said pyrolysis liquid in a liquid state at an operating temperature at which the feed material undergoes pyrolysis to form pyrolysis vapours, heavy solid pyrolysis products, and light solid pyrolysis products, the bottom of said pyrolysis chamber being sloped downward, relative to said top of the pyrolysis chamber and sloping away from the charging end of the pyrolysis chamber thereby defining a low area of the pyrolysis chamber at which said heavy solid pyrolysis products collect;
    an extractor in communication with a top section of the pyrolysis chamber for removing the pyrolysis vapours and said light solid pyrolysis products from the pyrolysis chamber; and
    means for removing said heavy solid pyrolysis products from said pyrolysis chamber.

2. The system of claim 1, wherein said pyrolysis chamber comprises one or more separators extending downward from the top and dividing the pyrolysis chamber into at least two fluidly interconnected legs, and a first leg of the at least two fluidly interconnected legs is configured to receive the feed material charged from the charging vessel and to communicate with said extractor.

3. The system of claim 2, wherein at least a second leg of the at least two fluidly interconnected legs is configured to be opened to the atmosphere without emitting said pyrolysis vapours to the atmosphere from said second leg.

4. The system of claim 1, wherein said sloped bottom of said pyrolysis chamber is sloped downward at an angle of between 10 and 60 degrees relative to the top of the pyrolysis chamber.

5. The system of claim 1, wherein the means for removing said heavy solid pyrolysis products comprises an openable top and/or one or more solids removal devices extending into the pyrolysis liquid, the one or more solids removal devices being either movable or stationary.

6. The system of claim 1, wherein said extractor comprises a cyclone for separating said pyrolysis vapours and said light solid pyrolysis products.

7. The system of claim 1, wherein said charging vessel is equipped with a conveyor or a ram system designed to charge said feed material into said pyrolysis chamber.

8. The system of claim 1, wherein said charging vessel comprises a plurality of vessels.

9. The system of claim 1, wherein said charging vessel is a vertical vessel or a plurality of vertical or horizontal vessels or combinations thereof.

10. A method of recycling feed material using the system of claim 1, the method comprising the steps of:
    charging said feed material into a charging vessel, said charging vessel adapted to remove air from said feed material;
    charging said feed material from said charging vessel into a pyrolysis chamber comprising a pyrolysis liquid, the pyrolysis chamber having a sloped bottom;
    allowing heavy and light solid pyrolysis products associated with said feed material to separate within said pyrolysis liquid such that the light solid pyrolysis products separate to the top of said pyrolysis liquid;
    removing any pyrolysis vapours and said light solid pyrolysis products via an extractor from the surface of said pyrolysis liquid; and
    removing said heavy solid pyrolysis products from the sloped bottom of said pyrolysis chamber with a removal device.

* * * * *